United States Patent
Gounder

[11] Patent Number: 5,285,629
[45] Date of Patent: Feb. 15, 1994

[54] CIRCULATING FLUIDIZED BED POWER PLANT WITH TURBINE FUELED WITH SULFUR CONTAINING FUEL AND USING CFB TO CONTROL EMISSIONS

[75] Inventor: Ponnusami K. Gounder, San Diego, Calif.

[73] Assignee: Pyropower Corporation, San Diego, Calif.

[21] Appl. No.: 981,773

[22] Filed: Nov. 25, 1992

[51] Int. Cl.⁵ .............................................. F02B 43/00
[52] U.S. Cl. .............................. 60/39.12; 60/39.182; 122/7 R
[58] Field of Search ............... 60/39.12, 39.182, 39.464; 122/7 D, 7 R

[56] References Cited

U.S. PATENT DOCUMENTS

| | | | |
|---|---|---|---|
| 4,212,160 | 7/1980 | Blaskowski | 60/39.182 X |
| 4,250,704 | 2/1981 | Bruckner et al. | 60/39.12 |
| 4,478,039 | 10/1984 | Horgan | 60/39.182 |
| 4,566,267 | 1/1986 | Muller et al. | 60/39.12 |
| 4,569,194 | 2/1986 | Giles et al. | 60/39.12 |
| 4,638,765 | 1/1987 | Skinner | 122/7 R |
| 4,723,407 | 2/1988 | Goebel et al. | 60/39.12 |
| 4,773,214 | 9/1988 | Pitt et al. | 122/7 R |
| 4,845,942 | 7/1989 | Schemenau et al. | 60/39.182 |
| 4,896,498 | 1/1990 | Knizia | 60/39.182 |
| 5,079,909 | 1/1992 | Bruckner | 60/39.182 |
| 5,212,941 | 5/1993 | Croonenbrock et al. | 60/39.12 |

FOREIGN PATENT DOCUMENTS 3230008 10/1991 Japan.

*Primary Examiner*—Richard A. Bertsch
*Assistant Examiner*—Michael I. Kocharov
*Attorney, Agent, or Firm*—Baker, Maxham, Jester & Meador

[57] ABSTRACT

A power plant having a fluidized bed steam boiler for supplying steam for powering a turbine generator comprises low pressure and high pressure feed water heaters, and combustion air heater is provided with a gas turbine for burning sulfur containing fuels, with heat recovery economizers for reducing the exhaust temperature of the gas turbine and directing the exhaust gas from the gas turbine into the fluidized bed for reducing the emissions therein.

10 Claims, 1 Drawing Sheet

CIRCULATING FLUIDIZED BED POWER PLANT WITH TURBINE FUELED WITH SULFUR CONTAINING FUEL AND USING CFB TO CONTROL EMISSIONS

BACKGROUND OF THE INVENTION

The present invention relates to power plants and pertains particularly to a CFB boiler plant, with gas turbine utilizing sulfur containing fuels with emissions controlled by the CFB boiler.

There exists in the power generating industry a need for more efficient power plants for converting fossil fuels to electrical power. The most commonly used gas turbine power generation systems are fueled by premium fuels, like natural gas. However, the cost and uncertainty of the availability of premium fuels make premium fuel gas turbine power generating plants less desirable. The most efficient overall plant system is the combined cycle (gas and steam) system. Therefore, there also exists an even greater need for power plants capable of operating efficiently on lower grades of fuels that exist in abundance in many regions of the world.

Atmospheric pollution is of great concern throughout the world today. One of the major causes of atmospheric pollution is the burning of various fossil fuels for the generation of heat and power. Many fuels contain impurities, such as sulfur that is particularly noxious and polluting. Systems, including scrubbers, have been developed for removing these pollutants from exhaust gases of power plants. However, these systems are very expensive and frequently not cost effective, particularly for gas turbine power plants.

Circulating fluidized bed boilers have been developed for burning low quality coals for powering steam turbines. The circulating fluidized bed contains sorbents like limestone or dolomite, which remove sulfur compounds from the exhaust gases and provide a somewhat economical system.

Sulfur containing fuels can be used in powering gas turbine engines if cost effective means is available to reduce Sulfur Oxide (SOx) emissions from the exhaust. In gas turbine applications, the air quantity used is four to five times higher than conventional coal fired boilers. Therefore, the scrubber costs are also four to five times higher per KW output of the gas turbine. This makes the use of sulfur containing fuels in gas turbines uneconomical with present systems.

Applicant has discovered an arrangement whereby a gas turbine for burning sulfur containing fuels can be added to or combined with a circulating fluidized bed (CFB) boiler plant, with the CFB serving as a scrubber for the gas turbine exhaust and makes the combined system more efficient and cost effective.

SUMMARY AND OBJECTS OF THE INVENTION

It is the primary object of the present invention to provide an improved combined CFB and gas turbine power plant, which can utilize low grade fuels.

In accordance with a primary aspect of the present invention, a power plant having CFB boilers is provided with a gas turbine for burning sulfur containing fuels, with the CFB boiler firing coal is used as a scrubber for the turbine exhaust.

BRIEF DESCRIPTION OF THE DRAWING

The above and other objects and advantages of the present invention will become apparent from the following description when read in conjunction with the accompanying drawings wherein:

The drawing is a schematic diagram illustrating a combined CFB and gas turbine system in accordance with the present invention.

DETAILED DESCRIPTION OF A PREFERRED EMBODIMENT

Figure 1:
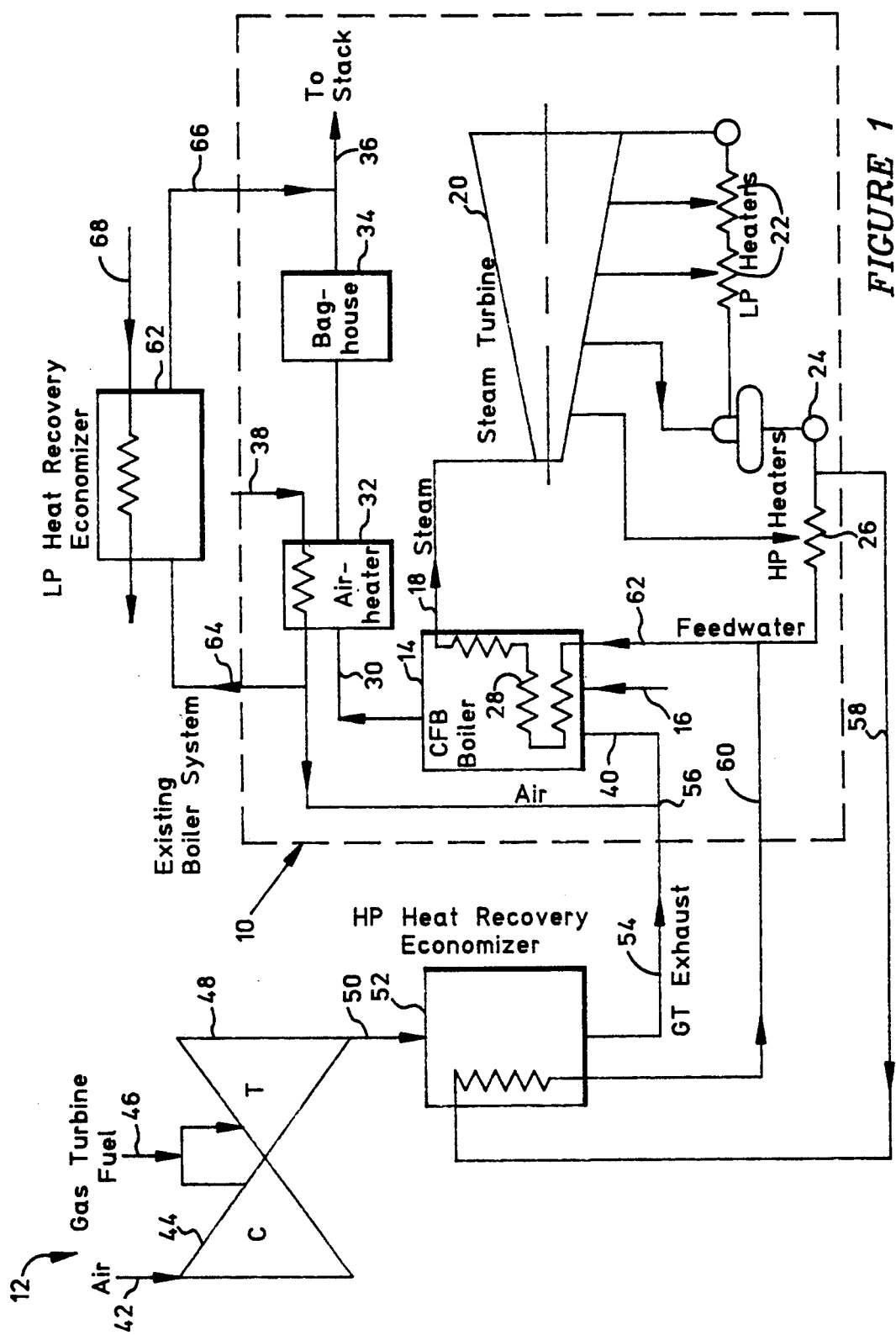

Referring to the drawing, there is schematically illustrated a circulating fluidized bed (CFB) power plant, designated generally by the numeral 10, of a generally conventional construction. A gas turbine, designated generally at 12, has been added to the power plant for burning sulfur containing fuel oils to provide a combined cycle power plant to operate more efficiently on low grades of fuel. A combined cycle power plant uses both a gas cycle and a steam cycle. The power plant 10 is a traditional coal fired circulating fluidized bed boiler steam generating plant powering one or more steam turbines.

The power plant comprises a circulating fluidized bed boiler 14, which receives fuel and limestone or other absorbents at 16 for heating and generating steam, which is fed by lines 18 to a steam turbine 20. Sorbents are continuously circulated through the combustor for reducing SOx and other emissions. The exhaust gases of the turbine are thereby scrubbed of SOx emissions along with the combustor gases in the combustor.

Exhaust steam from the steam turbine 20 heats feed water in low pressure heaters 22 ahead of the feed water pump 24, with high pressure heater 26 heating feed water after the pump 24 for circulating through the heating coils 28 of the circulating fluidized bed boiler 14. A portion (or the whole) of the feed water from pump 24 is fed by a line 58 into the economizer 52 for preheating, and is then fed by line 60 where it joins with line 62, feeding water into the boiler 14.

Exhaust gases from the combustor of the boiler pass by way of a flue 30 to air heater 32 for heating air supply to the combustor and then to baghouse 34 and to stack 36. Combustion air (make up air other than gas turbine exhaust flow) for the circulating fluidized bed boiler (CFB) 14 enters the system at 38, passing through air heater 32 and is fed into the combustor at 40.

A low cost modification to the plant to add a gas turbine for burning sulfur containing fuels comprises the addition of a gas turbine 12, which takes in air at 42 into a compressor 44, with fuel being added at 46 into the burner, and the gases generated fed into the turbine 48 and exhausted by exhaust 50 into an economizer 52.

The economizer 52 reduces the exhaust gases from the turbine to an acceptable temperature level to pass into the CFB. The economizer is used to raise the feed water temperature while bypassing the high pressure feed water heaters. The steam normally used for the high pressure feed water heaters is thus made available for expansion in the steam turbine to produce more electrical output from the steam turbine generator. The exhaust gases are fed by exhaust line 54 and combined with and introduced with the combustion gases at 40 to the fluidized bed boiler. The exhaust gases of the turbine are thereby scrubbed of SOx emissions along with the combustor gases in the combustor.

The gas turbine utilizes from four to five times the quantity of air per kilowatt hour of electrical output as that of the coal fired boilers. Thus, the exhaust gases from the gas turbine must be matched to the maximum quantity of gas that can be passed through the combustor of the boiler, along with the necessary combustion air. The heat recovery economizer is sized to reduce the turbine exhaust temperature low enough to be introduced into the CFB using the air heater inlet system. The exhaust gases of the turbine are mixed with air from the air heater 32 at 56 and pass with the air heater inlet air in the boiler through the fluidized bed. The fluidized bed takes care of removal of sulfur and reduction in nitrogen-oxides (NOx) emissions. The gas turbine size is limited by the maximum quantity of exhaust gas that can be passed along with the necessary combustion air through the boiler.

A bypass system is provided by means of a low pressure heat recovery economizer 62 through which boiler air heater air is partially or fully bypassed by way of ducts 64 and 66 to the stack 36. It may be necessary to operate the boiler air system fans (PA/SA fans) to reduce the gas temperature entering the baghouse to an acceptable level This heat bypassed to the heat recovery economizer may be used to heat low pressure feed water taken from a location before the feed pump 24 by way of a line 68.

The CFB boiler steam generation capacity is reduced to the extent of fuel input in the gas turbine (for the same oxygen percent leaving CFB). The combined (gas turbine plus steam turbine) power output will be higher than the CFB plant alone. The system is operated in a combined cycle mode, which improves the overall plant efficiency. This invention provides means and method for modifying existing CFB power plants by adding a gas turbine and provides a more efficient system capable of economically utilizing sulfur containing fuels.

The subject invention provides a low cost, economical means of obtaining the benefits of gas turbine in a power plant and also the capability of burning sulfur containing fuel oils. It provides a means and method for modifying existing CFB plants for greater efficiency and to economically handle sulfur containing fuels and gases.

Other modifications and changes are possible in the foregoing disclosure and in some instances, some features may be employed without the corresponding use of other features. Accordingly, while the present invention has been illustrated and described with respect to specific embodiments, it is to be understood that numerous changes and modifications may be made therein without departing from the spirit and scope of the invention as defined in the appended claims.

I claim:

1. A combined cycle power plant for burnish low quality fuels comprising, in combination:
   a steam turbine;
   a circulating fluidized bed boiler for supplying steam to said steam turbine, a supply of sorbents continuously circulated through the fluidized bed of said boiler;
   a gas turbine for burning sulfur containing fuel, said turbine sized to supply the maximum quantity of exhaust gas that can pass through the fluidized bed of said boiler;
   a heat recovery econimizer;
   a source of feedwater including a pump, and means for passing said feedwater through said economizer to said boiler; and
   means for directing exhaust gases of said gas turbine through the economizer, prior to entering the fluidized bed boiler, for reducing the temperature of the exhaust gases for raising the temperature of the feedwater and through the fluidized bed of said fluidized bed boiler for reducing sulfur emissions therein.

2. A power plant according to claim 1 wherein said plant has high pressure feedwater heaters and further comprising means for bypassing the high pressure feed water heaters of said plant for making any steam normally required by the high pressure feedwater heaters available to the steam turbine.

3. A power plant according to claim 2 wherein the boiler has an air system including an air heater, and the heat recovery economizer is sized to reduce the gas turbine exhaust temperature sufficiently low to be introduced into the air system along with the air from the boiler air heater.

4. A power plant according to claim 3 further comprising a baghouse and bypass means for bypassing air from the boiler air heater to the stack for reducing gas temperature to the baghouse.

5. A power plant according to claim 4 further comprising a low pressure heat recovery economizer for heating feed water prior to the feed water pump.

6. A power plant according to claim 1 wherein:
   said power plant is a standard circulating fluidized bed boiler plant for powering a steam turbine to which said gas turbine and a high pressure economizer and a low pressure economizer have been added;
   said exhaust gases of the gas turbine are passed through said high pressure heat recovery economizer for lowering the temperature thereof prior to introduction into said circulating fluidized bed boiler;
   said power plant includes high pressure feedwater heaters and means for bypassing the high pressure feed water heaters for directing the steam for use in the steam turbine; and
   the heat recovery economizer is sized to reduce the gas turbine exhaust temperature to a level to be introduced with air from the boiler air heater.

7. In a power plant having a circulating fluidized bed steam boiler for supplying steam to a turbine, a source of feedwater including a pump operatively connected for supply to the boiler, low pressure feed water heaters for heating the feedwater, high pressure feed water heaters for heating the feedwater, air heaters for heating intake air to the boiler and a baghouse operatively connected for receiving spent exhaust gases from the boiler, the improvement comprising:
   a gas turbine for burning high sulfur fuel connected to pass the entire exhaust therefrom into the circulating fluidized bed of the steam boiler for reducing sulfur emissions therein, said gas turbine being sized to the maximum quantity of gas that can pass through the boiler;
   a high pressure heat recovery economizer, upstream of the fluidized bed boiler, for reducing the temperature of the turbine exhaust gas to be introduced with air from the boiler air heater outlet and for heating feed water; and bypass means for bypassing air from the boiler air heater to the stack for reducing air temperature to the baghouse.

8. A power plant according to claim 7 further comprising a low pressure heat recovery economizer for heating feed water prior to the feed water pump.

9. A power plant according to claim 7 comprising means for bypassing said high pressure feed water heaters of said power plant for making any steam normally required by the high pressure feedwater heaters available to the steam turbine.

10. A power plant according to claim 7 wherein:
said power plant is a standard circulating fluidized bed boiler plant including a steam turbine powered by the boiler and to which said gas turbine and a high pressure economizer and a low pressure economizer have been added;

means are provided for passing said exhaust gases of the gas turbine through a heat recovery economizer prior to introduction into said circulating fluidized bed boiler for lowering the temperature thereof;

the heat recovery economizer is of a size to reduce the gas turbine exhaust temperature to be introduced with that from the boiler air heater; and further comprising means for bypassing the high pressure feed water heaters for making any steam normally required by the high pressure feedwater heaters available to the steam turbine.

* * * * *